United States Patent
Li et al.

(10) Patent No.: US 10,516,324 B2
(45) Date of Patent: Dec. 24, 2019

(54) STEP MOTOR

(71) Applicant: Johnson Electric S.A., Murten (CH)

(72) Inventors: Yue Li, Hong Kong (CN); Chui You Zhou, Shenzhen (CN); Yong Wang, Shenzhen (CN); Yong Li, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 413 days.

(21) Appl. No.: 15/291,476

(22) Filed: Oct. 12, 2016

(65) Prior Publication Data

US 2017/0104403 A1    Apr. 13, 2017

(30) Foreign Application Priority Data

Oct. 12, 2015   (CN) .......................... 2015 1 0658751

(51) Int. Cl.
| | |
|---|---|
| *H02K 37/14* | (2006.01) |
| *H02K 1/14* | (2006.01) |
| *H02K 1/02* | (2006.01) |
| *H02K 1/27* | (2006.01) |
| *H02K 3/18* | (2006.01) |

(52) U.S. Cl.
CPC .............. *H02K 37/14* (2013.01); *H02K 1/02* (2013.01); *H02K 1/146* (2013.01); *H02K 1/148* (2013.01); *H02K 1/2706* (2013.01); *H02K 3/18* (2013.01)

(58) Field of Classification Search
CPC .......... H02K 37/14; H02K 1/02; H02K 1/146; H02K 1/148; H02K 1/2706; H02K 3/18
See application file for complete search history.

(56) References Cited

U.S. PATENT DOCUMENTS

| | | | | |
|---|---|---|---|---|
| 4,365,180 A | * | 12/1982 | Licata | ...................... H02K 1/26 29/598 |
| 5,986,377 A | * | 11/1999 | Yamada | .................. H02K 1/148 310/216.013 |
| 6,369,687 B1 | * | 4/2002 | Akita | ..................... H02K 1/148 310/216.011 |
| 2002/0047766 A1 | * | 4/2002 | Futami | ..................... H02K 3/18 335/284 |
| 2002/0130750 A1 | * | 9/2002 | Miyake | .................. H02K 1/148 336/192 |

(Continued)

FOREIGN PATENT DOCUMENTS

| | | |
|---|---|---|
| CN | 1407697 A | 4/2003 |
| CN | 1967968 A | 5/2007 |

*Primary Examiner* — Mohamad A Musleh

(74) *Attorney, Agent, or Firm* — Muncy, Geissler, Olds & Lowe, P.C.

(57) ABSTRACT

A step motor includes a stator and a rotor. The stator includes a stator core and stator windings. The stator core includes a ring shaped yoke and a plurality of teeth extending inwardly from the ring shaped yoke. The rotor is rotatably mounted with respect to the stator. The rotor includes a permanent magnet member surrounded by the plurality of teeth. The stator windings are wound around the plurality of teeth to form a plurality of stator poles. The stator core are formed from a core strip with High magnetic conductive, the core strip are bent to enable opposite ends of the core strip to be connected with each other. The step motor of the present invention has a simplified structure and enhanced efficiency.

14 Claims, 6 Drawing Sheets

(56) References Cited

U.S. PATENT DOCUMENTS

| | | | | |
|---|---|---|---|---|
| 2002/0163277 A1* | 11/2002 | Miyake | .................... | H02K 1/14 |
| | | | | 310/216.001 |
| 2004/0084988 A1* | 5/2004 | Sheeran | ................ | H02K 1/148 |
| | | | | 29/596 |
| 2004/0217669 A1* | 11/2004 | Fujii | ...................... | H02K 1/148 |
| | | | | 310/216.045 |
| 2005/0067912 A1* | 3/2005 | Murakami | ............ | H02K 1/148 |
| | | | | 310/216.043 |
| 2012/0200249 A1* | 8/2012 | Lin | ........................ | H02K 37/14 |
| | | | | 318/696 |
| 2013/0270959 A1* | 10/2013 | Kreidler | ................. | H02K 1/148 |
| | | | | 310/215 |
| 2015/0357894 A1* | 12/2015 | Wu | ........................ | H02K 37/18 |
| | | | | 310/49.01 |
| 2016/0352204 A1* | 12/2016 | Li | .......................... | H02K 21/14 |
| 2017/0063180 A1* | 3/2017 | Li | .......................... | H02K 29/03 |
| 2017/0063208 A1* | 3/2017 | Li | .......................... | H02K 29/03 |

\* cited by examiner

STEP MOTOR

CROSS REFERENCE TO RELATED APPLICATIONS

This non-provisional patent application claims priority under 35 U.S.C. § 119(a) from Patent Application No. 201510658751.7 filed in The People's Republic of China on Oct. 12, 2015.

FIELD OF THE INVENTION

The present invention relates to motors, and in particular to a step motor.

BACKGROUND OF THE INVENTION

Step motors have been widely used in the control field because of the advantages of low noise, large power output and good dynamic performance. Traditional step motors include claw pole step motors and hybrid step motors. However, the traditional step motors have a complicated structure and high manufacturing cost.

SUMMARY OF THE INVENTION

Thus, there is a desire for a step motor with simplified structure.

A step motor is provided which includes a stator and a rotor. The stator includes a stator core and stator windings. The stator core includes a ring shaped yoke and a plurality of teeth extending inwardly from the ring shaped yoke. The rotor is rotatably mounted with respect to the stator. The rotor includes a permanent magnet member surrounded by the plurality of teeth. The stator windings are wound around the plurality of teeth such that the stator forms eight stator poles. The permanent magnet member forms twelve permanent magnetic poles. In the embodiment, the step motor is a two-phase step motor, and a step angle of the step motor is 15 degrees.

DETAILED DESCRIPTION OF THE PREFERRED EMBODIMENTS

Figure 1:
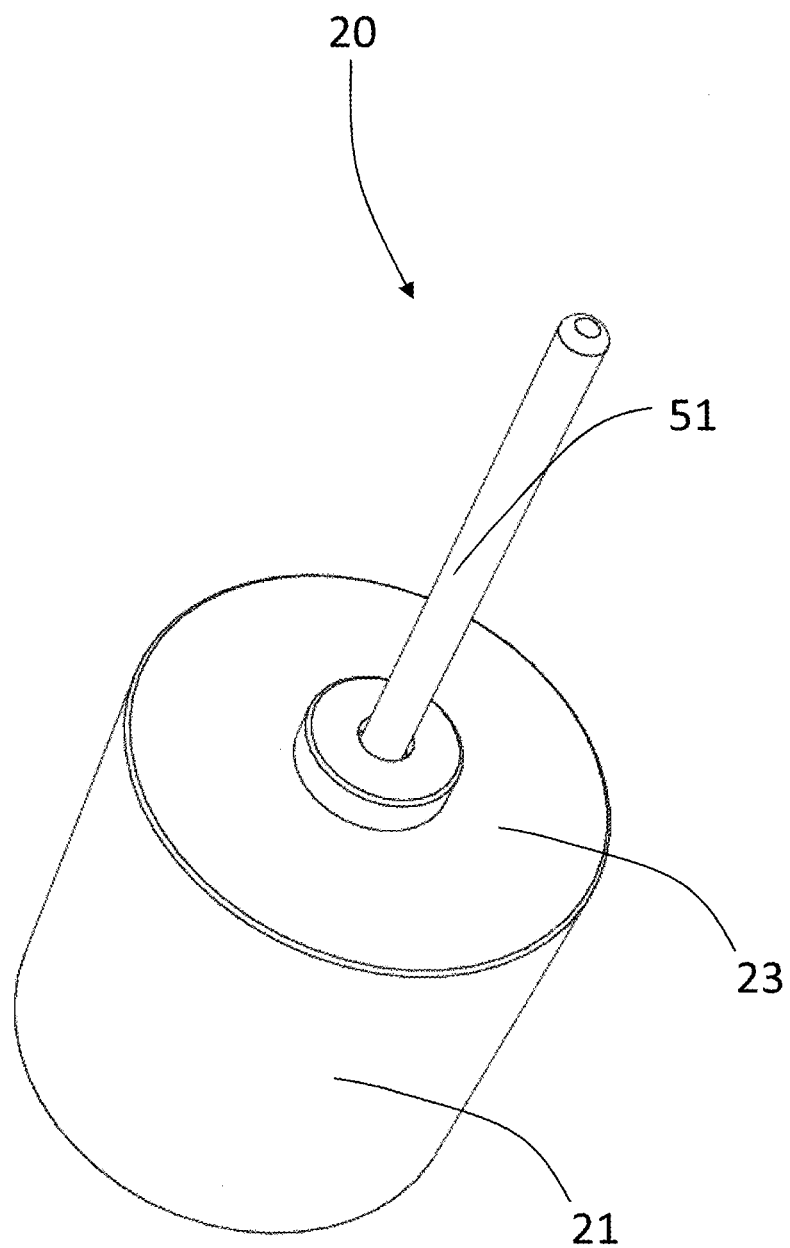
FIG. 1 illustrates a step motor according to one embodiment of the present invention.
Figure 2:
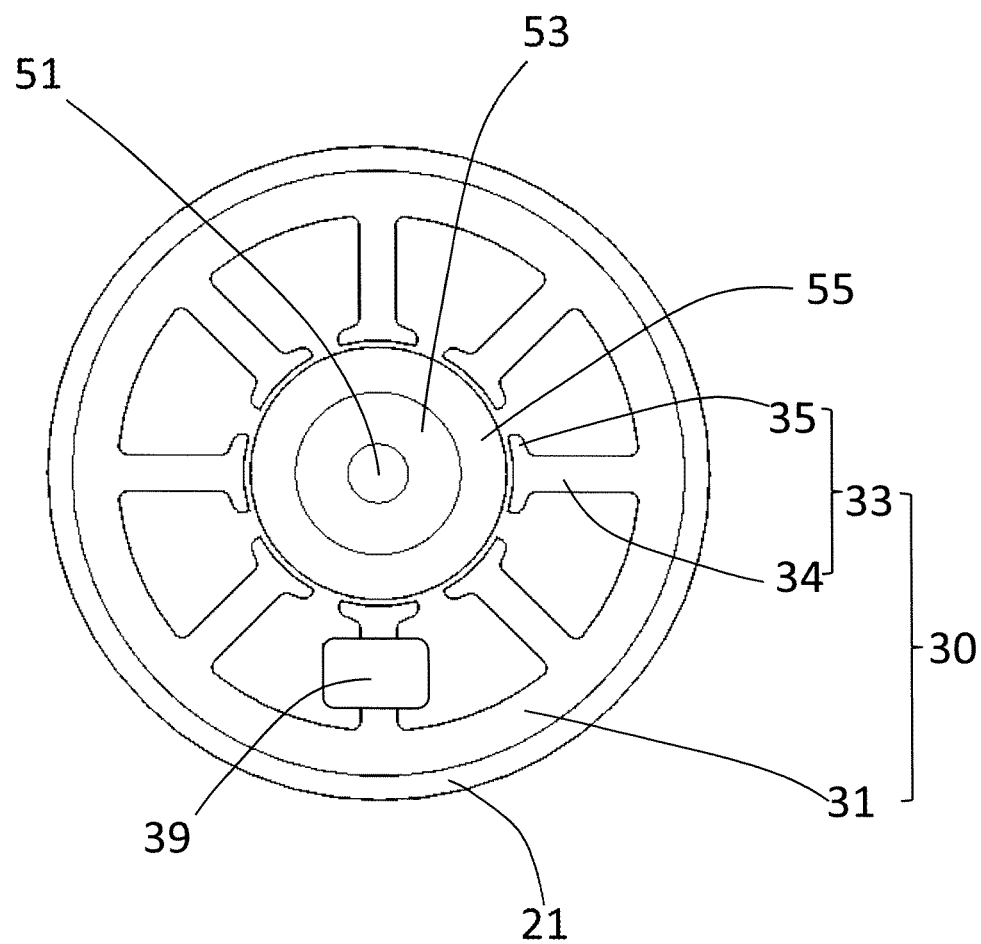
FIG. 2 illustrates the stator core and rotor core of the step motor of FIG. 1.

Referring to FIG. 1 and FIG. 2, a step motor in accordance with one embodiment of the present invention includes a stator and a rotor. The stator includes a cylindrical outer housing 21 with one open end, an end cover 23 mounted to the open end of the outer housing 21, a stator core 30 mounted to an inner wall surface of the outer housing 21, and stator windings 39 wound around teeth 33 of the stator core 30. The stator core 30 is made from a magnetic-conductive soft magnet material. The stator core 30 includes a ring shaped yoke 31 and eight teeth 33 extending inwardly from the yoke 31. Each tooth 33 includes a tooth body 34 extending from the yoke 31 and a pole shoe 35 extending from a distal end of the tooth body 34 toward two sides of the tooth body 34. The stator windings 39 are wound around the tooth bodies 34 as concentrated windings, such that the teeth 33 respectively form stator poles upon the stator windings 39 being energized. FIG. 2 illustrates only one coil of the stator windings 39. It should be understood that each tooth 33 is wound with a corresponding coil. As such, the stator has eight stator poles in this embodiment.

The rotor includes a rotary shaft 51, a rotor core 53 fixed to the rotary shaft, and a permanent magnet member 55 fixed to the rotor core 53. The permanent magnet member 55 forms twelve permanent magnetic poles along an outer circumference of the rotor, including six N-poles and six S-poles alternatively arranged along the circumferential direction.

An air gap is defined between the outer circumference of the rotor and the various pole shoes 35 for allowing rotation of the rotor relative to the stator. Preferably, in this embodiment, the air gap has a uniform radial thickness to reduce noise. In an alternative embodiment, the radial thickness of the air gap may also be non-uniform. For example, the radial thickness of the air gap is symmetrical about a center line of the stator pole and progressively increases or decreases from a center toward two ends of the stator pole, thus forming a symmetrical uneven air gap.

In this embodiment, the permanent magnet member 55 is an integral ring shaped permanent magnet attached around the outer circumference of the rotor core 53. Preferably, an outer circumferential surface of the rotor core 53 may be provided with twelve grooves 56. Each groove 56 is located at a junction 57 between two adjacent permanent magnetic poles of the permanent magnet member 55, such that the magnetic flux of each permanent magnetic pole enters the rotor core 53 as much as possible. It should be understood that the permanent magnet member 55 may include a plurality of split-type permanent magnets. The split-type permanent magnets may be fixed to the outer circumferential surface of the rotor core 53 or alternatively embedded into the rotor core 53. Each permanent magnet may be circular-arc shaped or plate-shaped. It should be understood that, when the split-type permanent magnets are used, each permanent magnetic pole may be formed by one permanent magnet or alternatively by a plurality of joined permanent magnet.

In this embodiment, the permanent magnet member 55 is made of sintered Nd—Fe—B material, which is magnetized after being attached around the outer surface of the rotor core 53. It should be understood the permanent magnet member 55 may be another type of ring shaped isotropic permanent magnet member such as a rubber permanent magnet member.

Figure 3:
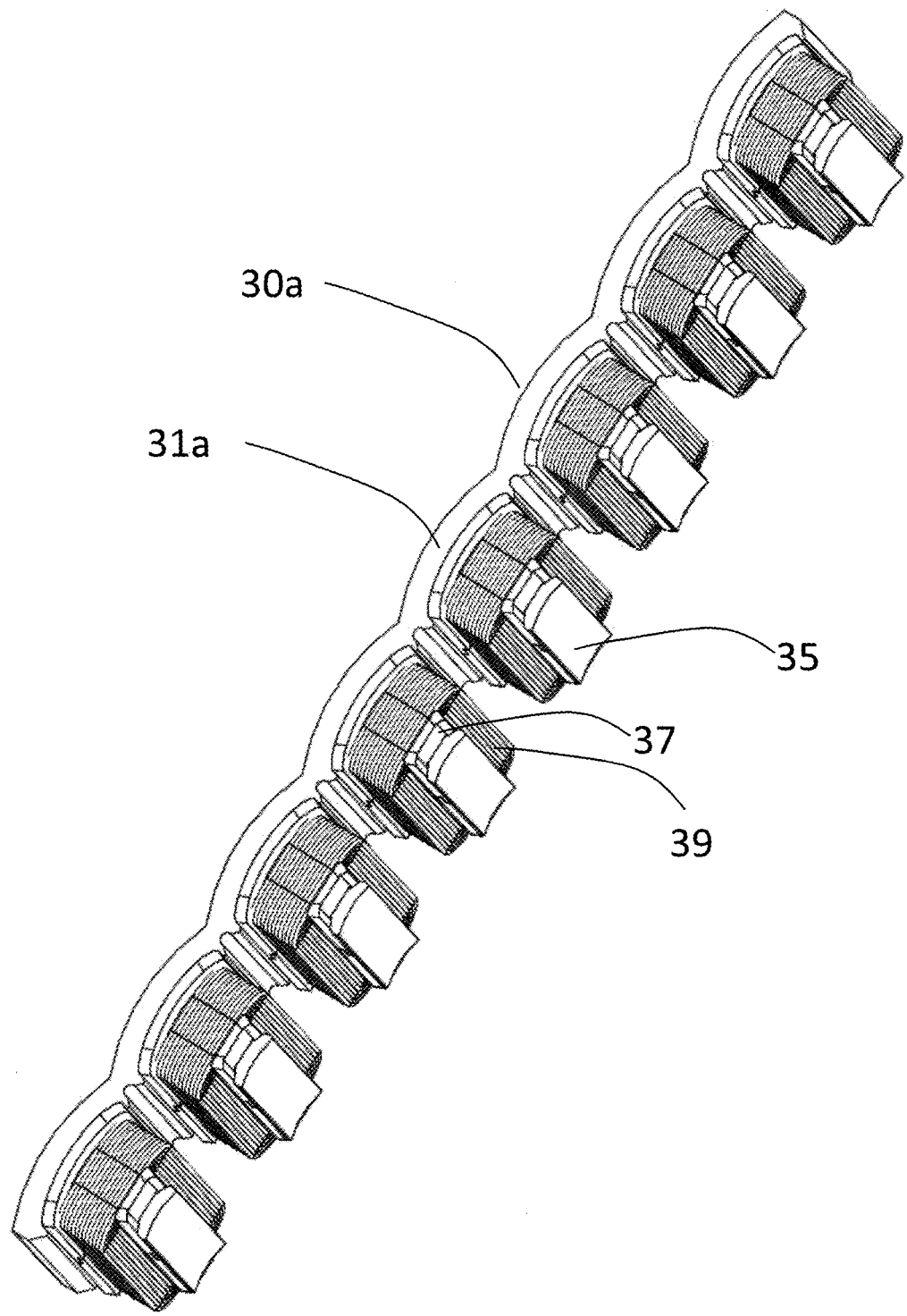
FIG. 3 is an unrolled view of the stator core of the step motor of FIG. 1.
Figure 4:
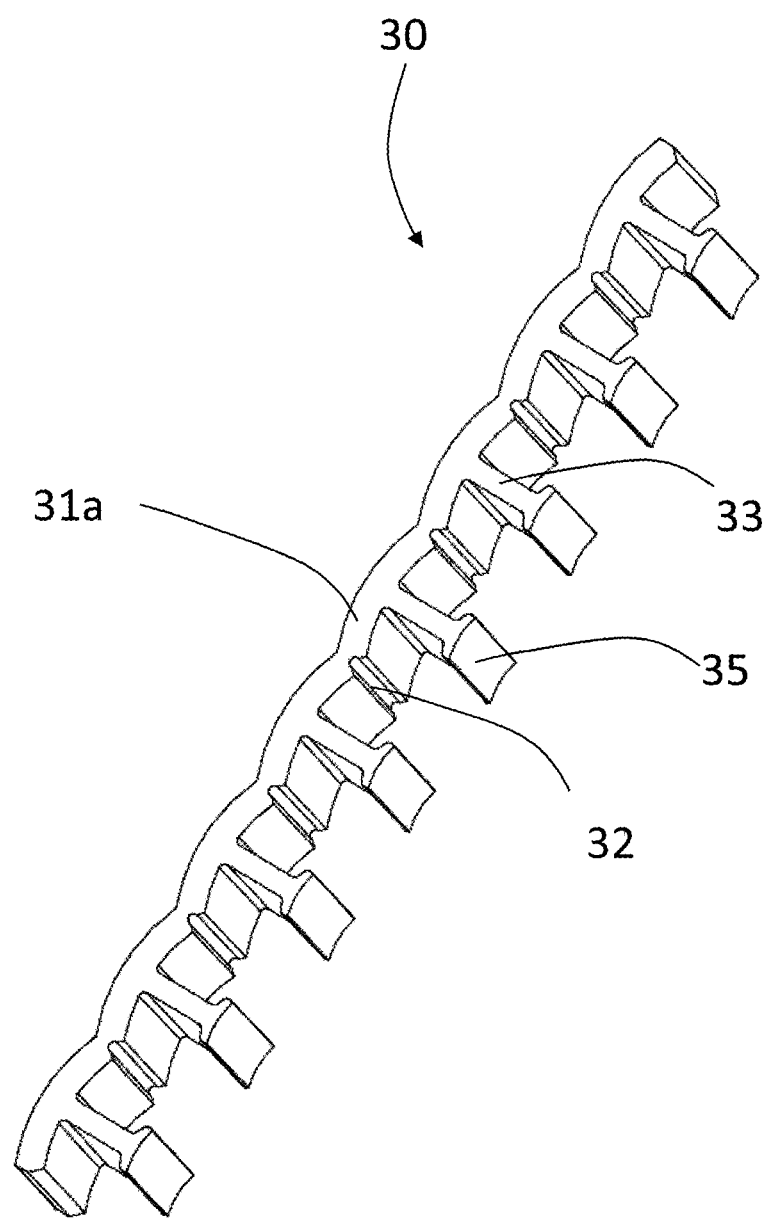
FIG. 4 illustrates a core strip of FIG. 3.

Referring to FIG. 3 and FIG. 4, in this embodiment, the stator core 30 is formed by bending a core strip. The core strip includes eight core units 30a. Each core unit 30a includes an arc shaped yoke unit 31a and a tooth 33 extending from the yoke unit 31a. A V-shaped groove 32 is formed at a connecting area between each two adjacent yoke units 31a for reducing a thickness of the connecting area. The core strip bends at the thickness reduced connecting area. After the core strip is bent, opposite ends of the core strip are magnetically conductively connected to each other. As such, after the core strip is bent, the twelve yoke units 31a form the ring shaped yoke 31. Preferably, after the core strip it bent, two inner wall surfaces of the V-shaped groove 32 abut against to each other.

In fabrication, insulating brackets 37 may be first mounted to the teeth 33 of the core strip, respectively. The stator windings 39 are then wound around the respective insulating brackets. The core strip is bent, and opposite ends of the core strip are welded to each other. This configuration can enhance the winding efficiency and assembly efficiency.

Figure 5:
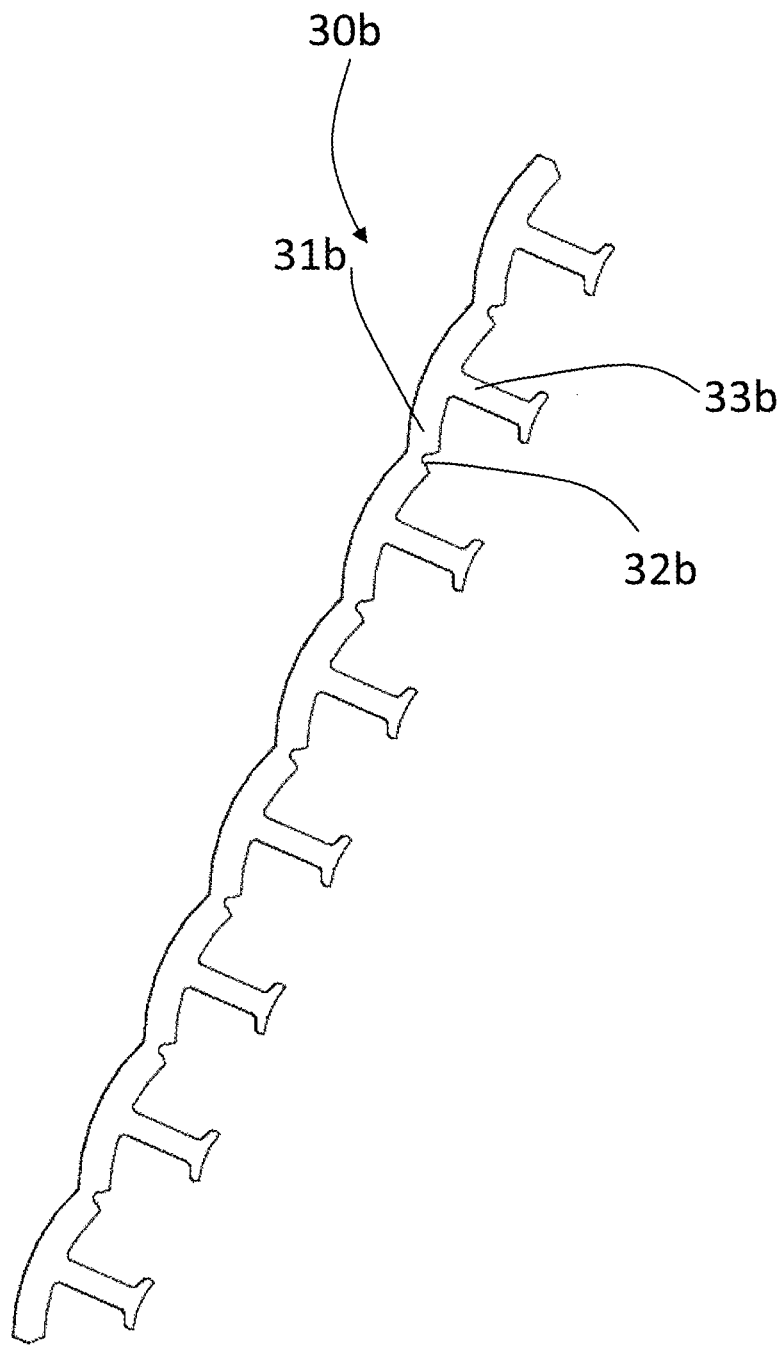
FIG. 5 illustrates a core lamination of the core strip of FIG. 4.
Figure 6:
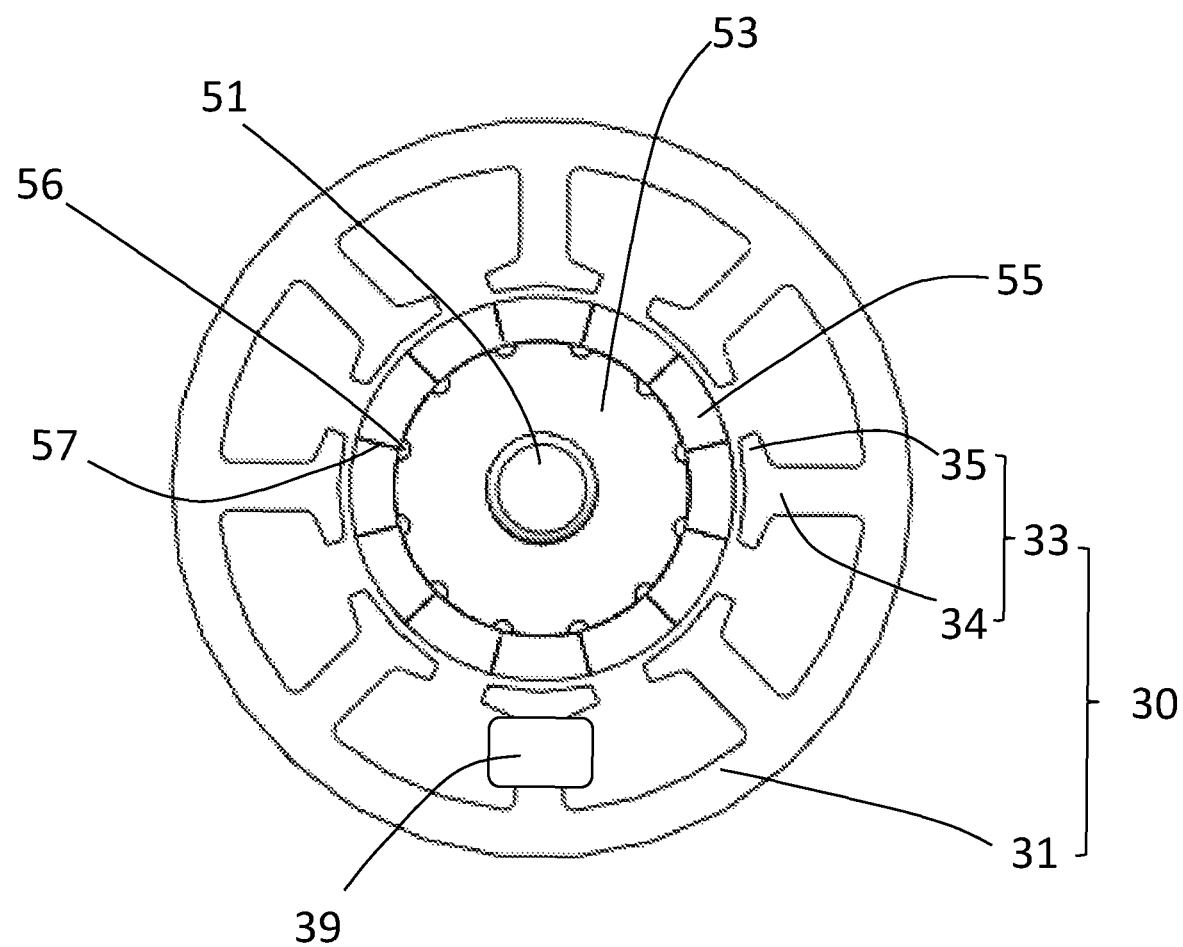
FIG. 6 is a schematic diagram showing the stator core and rotor core of the step motor of FIG. 1.

Referring to FIG. 4 and FIG. 5, the core strip includes a plurality of core laminations 30b stacked along an axial direction of the motor. Stacking multiple layers of the core laminations 30b of FIG. 5 along the axial direction of the motor results in the core strip 30a as shown in FIG. 4. The shape of the core laminations 30b is similar to the shape of the core strip. In particular, each core laminations 30b includes eight core lamination units 30b. Each core lamination unit 30b includes a circular-arc shaped yoke unit 31b and a tooth unit 33b extending from the yoke unit 31b. A V-shaped notch 32b is formed between each two adjacent yoke units 31b. Stacking multiple layers of the core laminations 30b of FIG. 5 along the axial direction of the motor results in the core strip 30a as shown in FIG. 4. The stacked yoke units 31b of the core laminations 30b correspondingly form the yoke units 31a of the core strip 30a, the stacked tooth units 33b of the core laminations 30b correspondingly form the teeth 33 of the core strip 30a, and the stacked V-shaped notches 32b of the core laminations 30b correspondingly form the V-shaped grooves 33 of the core strip 30a.

Although the invention is described with reference to one or more preferred embodiments, it should be appreciated by those skilled in the art that various modifications are possible. Therefore, the scope of the invention is to be determined by reference to the claims that follow.

The invention claimed is:

1. A step motor comprising:
a stator comprising a stator core and stator windings, the stator core comprising a ring shaped yoke and a plurality of teeth extending inwardly from the ring shaped yoke, the stator windings wound around the plurality of teeth to form a plurality of stator poles, wherein the stator core are formed from a core strip with high magnetic conductive, the core strip are bent to enable opposite ends of the core strip to be connected with each other; and
a rotor rotatably mounted with respect to the stator and comprising a permanent magnet member surrounded by the plurality of teeth, and the rotor further comprises a rotary shaft and a rotor core directly fixed to the rotary shaft, and an outer circumferential surface of the rotor core is provided with a plurality of grooves, each groove is located at a junction between two adjacent permanent magnetic poles of the permanent magnet member.

2. The step motor of claim 1, wherein the plurality of stator poles comprises eight stator poles, the permanent member forms twelve permanent magnetic poles.

3. The step motor of claim 2, wherein the step motor is a two-phase step motor, a step angle of the step motor is 15 degrees.

4. The step motor of claim 2, wherein the plurality of grooves comprises twelve grooves.

5. The step motor of claim 1, wherein the core strip comprises a plurality of core units, each core unit comprises an arc shaped yoke unit and one of the teeth extending from the yoke unit, a connecting area between each two adjacent yoke units has a reduced thickness, and the core strip bends at the thickness reduced area.

6. The step motor of claim 5, wherein an inner surface of the core strip is formed with a plurality of grooves, each groove located at the connecting area between two corresponding adjacent yoke units.

7. The step motor of claim 6, wherein the groove is V-shaped having two inner wall surfaces opposed to each other, and the two opposed inner wall surfaces abut against each other after the core strip is bent.

8. The step motor of claim 1, wherein the core strip is constructed by a plurality of core laminations stacked along an axial direction of the step motor.

9. The step motor of claim 8, wherein the permanent magnet member is an integral ring shaped permanent magnet or comprises a plurality of split-type permanent magnets.

10. The step motor of claim 1, wherein the permanent magnet member is fixed to an outer circumferential surface of the rotor core.

11. The step motor of claim 1, wherein the tooth comprises a tooth body extending inwardly from the ring shaped yoke and a pole shoe extending from a distal end of the tooth body, the pole shoe and the rotor form an air gap therebetween, and the air gap has a uniform radial thickness.

12. The step motor of claim 11, wherein the pole shoe of each tooth is symmetrical about a center line of its tooth body.

13. The step motor of claim 1, wherein the tooth comprises a tooth body extending inwardly from the ring shaped yoke and a pole shoe extending from a distal end of the tooth body, the pole shoe and the rotor form an air gap therebetween, and the air gap has a non-uniform radial thickness that is symmetrical about a center line of the tooth body.

14. The step motor of claim 1, wherein the permanent magnet member is made of sintered Nd—Fe—B material.

* * * * *